US012311668B2

(12) United States Patent
Kobayashi et al.

(10) Patent No.: US 12,311,668 B2
(45) Date of Patent: May 27, 2025

(54) LIQUID DISCHARGING APPARATUS

(71) Applicant: BROTHER KOGYO KABUSHIKI KAISHA, Nagoya (JP)

(72) Inventors: Kazuma Kobayashi, Nagoya (JP); Masako Kawagoe, Nagoya (JP); Haruhisa Shirai, Kasugai (JP); Shohei Ichikawa, Niwa (JP); Fumiya Nakamura, Nagoya (JP); Kazushige Saigusa, Nagoya (JP); Asami Hashimoto, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 162 days.

(21) Appl. No.: 18/191,043

(22) Filed: Mar. 28, 2023

(65) Prior Publication Data

US 2023/0311519 A1 Oct. 5, 2023

(30) Foreign Application Priority Data

Apr. 1, 2022 (JP) ................................ 2022-062148

(51) Int. Cl.
*B41J 2/17* (2006.01)
*B41J 2/165* (2006.01)

(52) U.S. Cl.
CPC ......... *B41J 2/1721* (2013.01); *B41J 2/16523* (2013.01)

(58) Field of Classification Search
CPC ............................ B41J 2/1721; B41J 2/16523
USPC ............................................................ 347/36
See application file for complete search history.

(56) References Cited

U.S. PATENT DOCUMENTS

| | | | |
|---|---|---|---|
| 2007/0263051 A1 | 11/2007 | Kawai et al. | |
| 2017/0282568 A1 | 10/2017 | Osakabe et al. | |
| 2018/0345674 A1 | 12/2018 | Ochiai | |

FOREIGN PATENT DOCUMENTS

| | | | | |
|---|---|---|---|---|
| JP | 2007-301756 A | | 11/2007 | |
| JP | 4233632 B2 | * | 3/2009 | ............ B41J 2/1652 |
| JP | 4273762 B2 | * | 6/2009 | |
| JP | 2018-202648 A | | 12/2018 | |
| JP | 2021-59123 A | | 4/2021 | |

* cited by examiner

*Primary Examiner* — Sharon Polk
(74) *Attorney, Agent, or Firm* — Merchant & Gould P.C.

(57) ABSTRACT

A liquid discharging apparatus, having a housing, a liquid discharging device configured to discharge liquid, a first waste liquid collecting device and a second waste liquid collecting device for collecting the liquid discharged from the liquid discharging device, an intermediate tank having a first waste liquid reservoir and a drainer, and a waste liquid tank having a second waste liquid reservoir, is provided. The first waste liquid reservoir stores the liquid received from the first liquid collecting device and the second waste liquid collecting device. The drainer drains the liquid stored in the first waste liquid reservoir outward from the intermediate tank. The second waste liquid reservoir stores the liquid drained from the drainer. The waste liquid tank is demountably mounted in the housing.

15 Claims, 8 Drawing Sheets

LIQUID DISCHARGING APPARATUS

REFERENCE TO RELATED APPLICATIONS

This application claims priority from Japanese Patent Application No. 2022-062148 filed on Apr. 1, 2022. The entire content of the priority application is incorporated herein by reference.

BACKGROUND ART

A liquid discharging apparatus that may discharge liquid, e.g., ink, to record an image on a recording medium is known. A part of the discharged liquid may be wasted without being used in the image recording, and the liquid discharging apparatus may be equipped with a waste liquid reservoir to store the waste liquid. The waste liquid reservoir may be detachable from a body of the liquid discharging apparatus.

The waste liquid, or the ink, may be suctioned by a maintenance device in the liquid discharging apparatus and may be guided by a drainer device to be collected in the waste liquid reservoir.

DESCRIPTION

Further to the maintenance device, the liquid discharging apparatus may have cleaning devices to clean the waste liquid. However, with the additional cleaning devices, a system to collect the waste liquid may complicate the structure in the liquid discharging apparatus.

The present disclosure is advantageous in that a liquid discharging apparatus, in which a configuration of a waste liquid tank is less complex, is provided.

FIRST EMBODIMENT

A first embodiment of the present disclosure will be described below.

Figure 1:
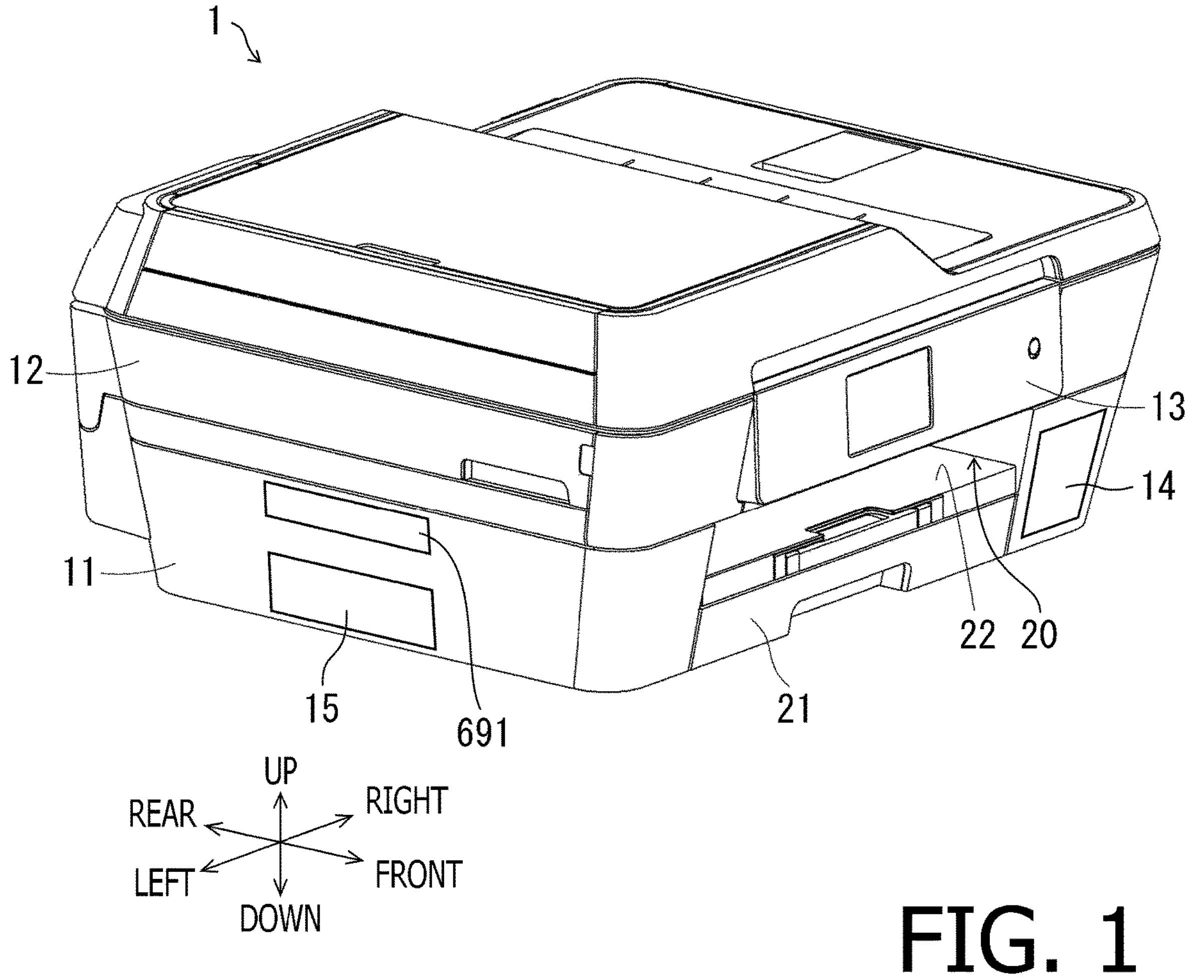
FIG. 1 is a perspective exterior view of an inkjet printer.

FIG. 1 is a perspective exterior view of an inkjet printer 1. The inkjet printer 1 shown in FIG. 1 may discharge liquid. In the following description, directions in the inkjet printer 1 are defined with reference to an orientation of the inkjet printer 1 in a usable condition set on a base plane as shown in FIG. 1: a vertical direction as indicated by upward and downward arrows in FIG. 1 includes up-to-down and down-to-up directions, whereas a side toward the base plane is defined as a lower side. A front-rear direction as indicated by arrows pointing lower-rightward and upper-rearward in FIG. 1 includes front-to-rear and rear-to-front directions, whereas a side on which an opening 20 is located is defined as a front side. A left-right direction, or a widthwise direction, as indicated by arrows pointing lower-leftward and upper-rightward in FIG. 1 includes leftward and rightward directions, whereas a lefthand side to a user who faces a face on the front side of the inkjet printer 1 is defined as a leftward side. The widthwise direction may also be called a scanning direction, in which a carriage 40 (see FIG. 2) is movable. The carriage 40 will be described further below.

As shown in FIG. 1, the inkjet printer 1 includes a main housing 11 and a scanner housing 12 stacked on an upper side in the inkjet printer 1. The main housing 11 and the scanner housing 12 together form a substantially rectangular boxed shape.

On a front side of the main housing 11, an operation panel 13 and a cartridge cover 14 are arranged. The operation panel 13 includes operation devices, such as operation buttons, and a liquid crystal display. The cartridge cover 14 is pivotable with respect to the main housing 11. Inside the cartridge cover 14, ink cartridges (not shown) are arranged and attached to a cartridge case (not shown). Moreover, on the front side of the main housing 11, the opening 20 is formed. Through the opening 20 formed on the front side of the main housing 11, a feeder tray 21 and an ejection tray 22 may be attached to or detached from the inkjet printer 1. The scanner housing 12 accommodates a scanner, which may read an image appearing on a sheet P.

On a sideward face of the main housing 11 in the widthwise direction, a tank exchangeable unit 15 is located. For example, the tank exchangeable unit 15 may be located on a leftward face of the main housing 11. The tank exchangeable unit 15 has a cover, which is pivotable with respect to the main housing 11. The cover being open allows a waste liquid tank 80 to be mounted in and demounted from the main housing 11. The waste liquid tank 80 may be mounted in and demounted from the main housing 11 from the leftward side of the main housing 11.

The tank exchangeable unit 15 may not necessarily have the cover being openable/closable. For example, a waste liquid tank unit, which consists of the waste liquid tank 80 and a tank retainer having the cover to retain the waste liquid tank 80, may be mounted in and demounted from the main housing 11. In this arrangement, when the waste liquid tank unit is demounted from the main housing 11, an opening having a form that corresponds to a form of the waste liquid tank unit may be exposed; and when the waste liquid tank unit is mounted in the main housing 11, the cover attached to the waste liquid tank unit may close the opening.

<Internal Configuration of Inkjet Printer 1>

Figure 2:
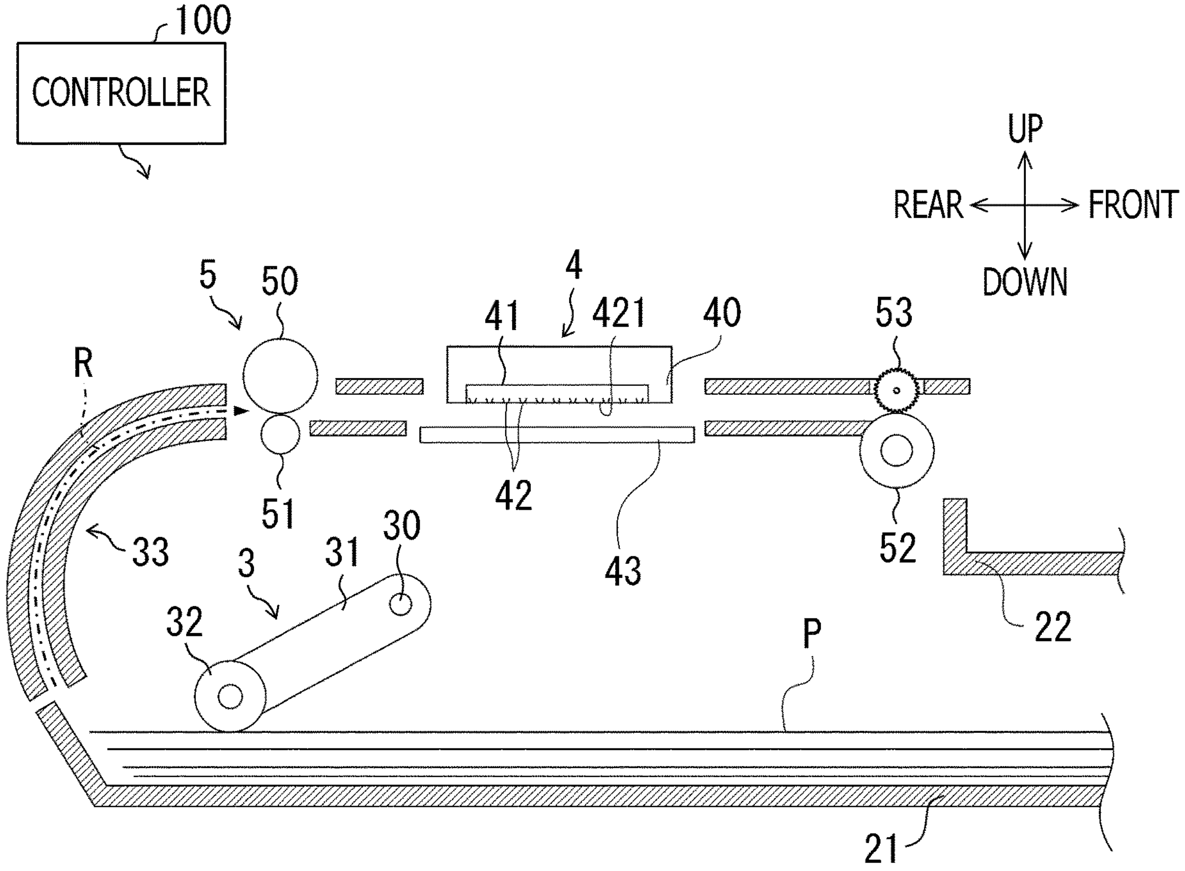
FIG. 2 is a cross-sectional view to illustrate an inner structure of the inkjet printer.

Next, an internal configuration of the inkjet printer 1 will be described with reference to FIG. 2. FIG. 2 is a cross-sectional view to illustrate an inner structure of the inkjet printer 1.

As shown in FIG. 2, the inkjet printer 1 includes a feeder 3, a recorder 4, a conveyer 5, and a controller 100.

The feeder 3 includes a shaft 30, a feeder arm 31, and a feeder roller 32. The feeder 3 may feed sheets P stored in the feeder tray 21 to a conveyer path R by rotating the feeder roller 32. The feeder roller 32 is located at a tip end of the feeder arm 31 and is supported rotatably by the feeder arm 31. The feeder arm 31 is pivotably supported by the shaft 30, which is supported by a frame of the inkjet printer 1. The feeder arm 31 is urged toward the feeder tray 21 by weight thereof or by an urging force from, for example, a spring.

The conveyer path R extends upward from a rear end of the feeder tray 21, curving frontward in an area delimited by a guide member 33, to the ejection tray 22.

The feeder roller 32 may, when a feeder motor (not shown) is activated by the controller 100, pick up the sheets P from the feeder tray 21 one by one. The sheets P picked up from the feeder tray 21 may be conveyed along the conveyer path R and fed to the recorder 4.

The recorder 4 is located above the feeder 3. The recorder 4 includes a carriage 40, a recording head 41, a plurality of nozzles 42, and a platen 43. The carriage 40 may, when a driving force from a carriage motor (not shown) is transmitted thereto, move back and forth in the scanning direction which is the widthwise direction, i.e., a direction of width of the sheet P being conveyed. For recording an image on the sheet P, the controller 100 of the inkjet printer 1 may repeat a recording process, in which the controller 100 operates the carriage 40 to move in the widthwise direction and the recording head 41 to discharge ink through the nozzles 42 while the sheet P stays still, and a conveying process, in which the controller 100 drives the conveyer roller 50 and the ejection roller 52 to convey the sheet P by a predetermined linefeed amount, alternately.

On the carriage 40, the recording head 41 for discharging liquid is mounted. The plurality of nozzles 42 are formed on a lower face of the recording head 41. The plurality of nozzles 42 are arrayed in lines along the front-rear direction to form nozzle lines, and four (4) nozzle lines are formed on a nozzle surface 421 to align in the widthwise direction. The nozzles 42 forming a first one of the nozzle lines, a second one of the nozzle lines, a third one of the nozzle lines, and a fourth one of the nozzle lines from right to left, may discharge inks in colors of black, yellow, cyan, and magenta, respectively. However, the aligning order of the nozzle lines may not necessarily be limited but may be changed optionally. Moreover, the number of nozzle lines may not necessarily be limited to four but may be, for example, one. For another example, the recording head 41 may not necessarily discharge inks in different colors but may discharge ink in a single color.

The recording head 41 may discharge ink droplets through the nozzles 42 by causing vibrating elements such as piezo elements to vibrate.

The platen 43 is located at a position below the recording head 41 and faces the nozzles 42. The platen 43 extends throughout or over the entire length of the sheet P in the widthwise direction. The platen 43 may support the sheet P from below during the recording process. While the carriage 40 moves in the widthwise direction over the sheet P supported by the platen 43, the recording head 41 may discharge the ink droplets selectively from the nozzles 42 to record the image on the sheet P.

The conveyer 5 includes the conveyer roller 50 and the ejection roller 52, which are located on one side and the other side, respectively, of the carriage 40 and the platen 43 in the front-rear direction. At a position below the conveyer roller 50, a pinch roller 51 is arranged to face the conveyer roller 50. The conveyer roller 50 may be driven by a conveyer motor (not shown) to rotate. The pinch roller 51 may rotate along with the rotation of the conveyer roller 50. With the rotation of the conveyer roller 50 and the pinch roller 51, the sheet P nipped between the conveyer roller 50 and the pinch roller 51 may be conveyed along the conveyer path R to the recorder 4.

The ejection roller 52 is located on a downstream side of the conveyer roller 50 across the carriage 40 and the platen 43 in a conveying direction to convey the sheet P from the feeder tray 21 to the ejection tray 22. At a position above the ejection roller 52, a spur roller 53 is arranged to face the ejection roller 52. The ejection roller 52 may be driven by the conveyer motor (not shown) to rotate. The spur roller 53 may rotate along with the rotation of the ejection roller 52. With the rotation of the ejection roller 52 and the spur roller 53, the sheet P nipped between the ejection roller 52 and the spur roller 53 may be ejected from the conveyer path R to rest at the ejection tray 22.

The controller 100 includes a Central Processing Unit (CPU), a Read-Only Memory (ROM), a Random Access Memory (RAM), and Application Specific Integrated Circuit (ASIC) including a variety of controlling circuits. The controller 100 is connected with devices that compose the inkjet printer 1, including the recording head 41 and the conveyer motor of the conveyer 5. The controller 100 is, moreover, connected with the operation panel 13 and external devices such as a PC (not shown).

The controller 100 may run programs stored in the ROM to cause the CPU and the ASIC to execute processes to control acts of the devices, including the recording head 41 and a maintenance unit 61, such as a flushing process to discharge ink droplets from the nozzles 42. The controller 100 may control the recording head 41 and the conveyer motor according to a printing command transmitted from the external device such as the PC and execute a printing process to print the image on the sheet P. The maintenance unit 61 and the flushing process will be described further below. It may be noted that the controller 100 may not necessarily consist of the CPU, the ROM, the RAM, and the ASIC alone but may consist of any hardware devices.

The inkjet printer 1 in the configuration as described above may operate the conveyer 5 to convey the sheet P in the conveying direction, move the carriage 40 along with the recording head 41 in the scanning direction, and operate the recording head 41 to discharge the ink to print an image on the sheet P.

<Configurations of Waste Liquid Collecting Devices>

Figure 3:
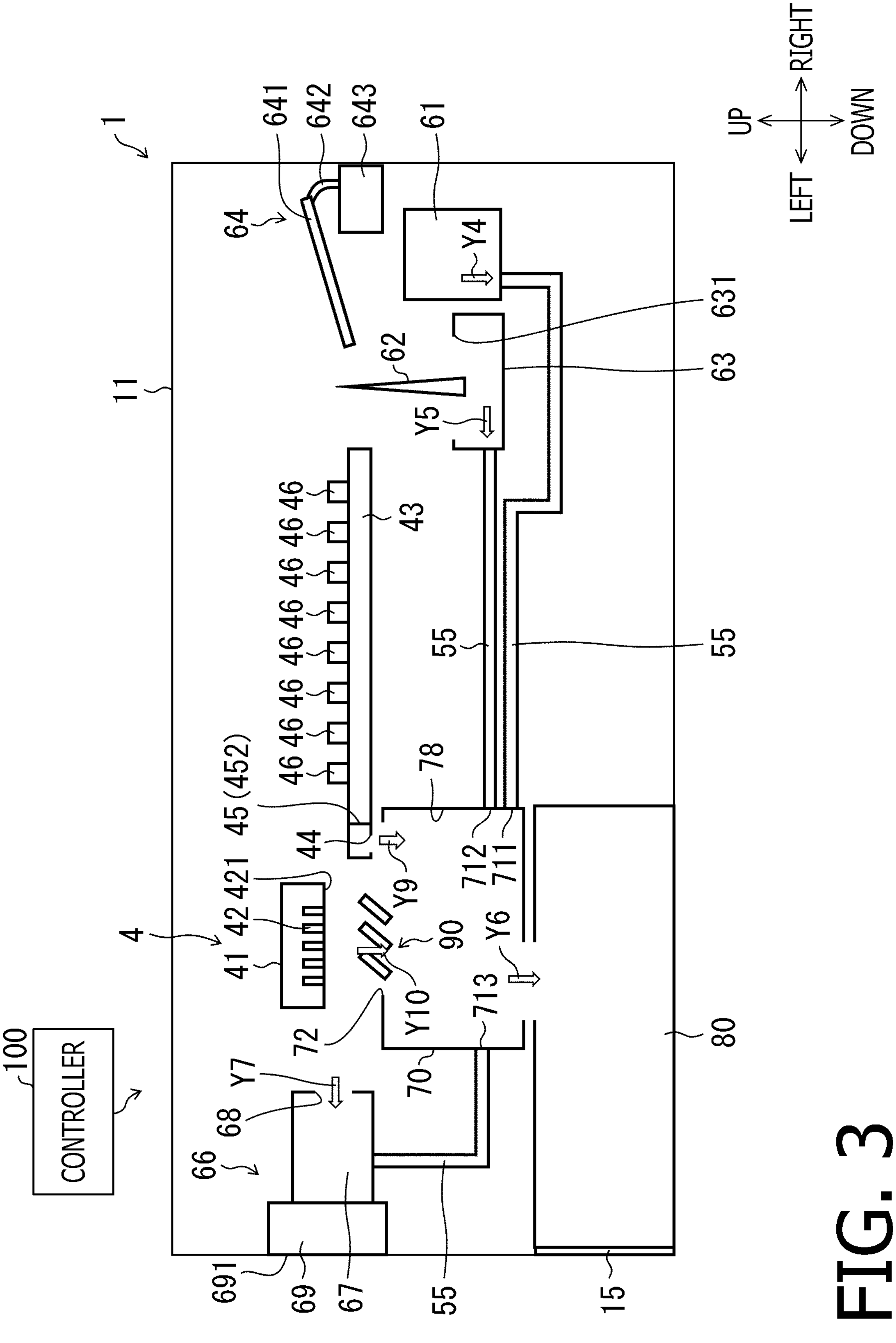
FIG. 3 is an illustrative view inside the inkjet printer viewed from a front side.
Figure 4:
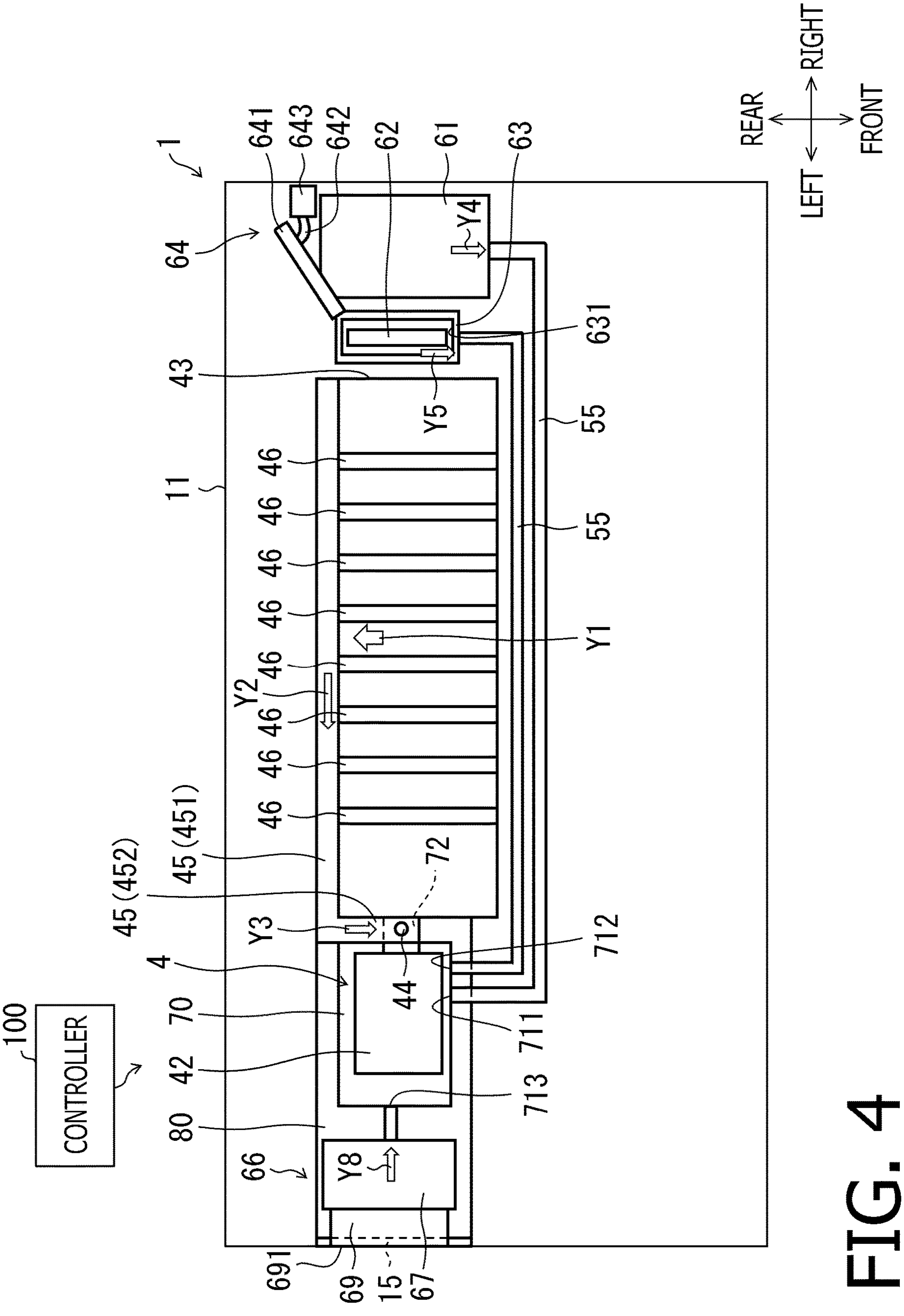
FIG. 4 is an illustrative top plan view of the inkjet printer.

Next, with reference to FIGS. 3-4, waste liquid collecting devices will be described. FIG. 3 is an illustrative view inside the inkjet printer 1 viewed from the front side. FIG. 4 is an illustrative top plan view of the inkjet printer 1. The arrangement of the items in the inkjet printer 1 shown in FIGS. 3-4 is merely an illustrative example and, unless otherwise noted, may not necessarily limit arrangement of the other items in the inkjet printer 1.

As shown in FIGS. 3-4, the inkjet printer 1 has the recorder 4, the platen 43, the maintenance unit 61, a wiper 62, a liquid reservoir 63, a cleaning liquid injector unit 64, a duct 66, an intermediate tank 70, the waste liquid tank 80, and a waste liquid guide 90.

The platen 43 may collect the ink discharged on the platen 43. The platen 43 has a slant surface, which slants in the front-rear direction to be lower toward the rear side. As shown in FIGS. 3-4, on a surface of the platen 43 toward the nozzles 42, a plurality of ribs 46 elongated in the front-rear direction are arranged. The platen 43 may support a sheet P on the plurality of ribs 46. As shown in FIG. 4, the platen 43 has a waste liquid chute 45 to collect the ink, i.e., waste liquid, flowing down along the slant surface of the platen 43. The waste liquid chute 45 may consist of, for example, gutters or grooves.

The waste liquid chute 45 is arranged in a rearend area and a leftward area in the platen 43, approximately in a form of L. In the following description, the rearward part of the waste liquid chute 45 will be called a rearward waste liquid chute 451, and the leftward part of the waste liquid chute 45 will be called a sideward waste liquid chute 452. In other words, the rearward waste liquid chute 451 and the sideward waste liquid chute 452 will be collectively called "waste liquid chute 45." The rearward waste liquid chute 451 slants to be lower toward the left. In the sideward waste liquid chute 452, a liquid outlet 44 is formed. The sideward waste liquid chute 452 slants to be lower toward the liquid outlet 44. Thus, the waste liquid chute 45 has a form, in which the collected ink may flow down toward the liquid outlet 44.

The ink discharged on the platen 43 may flow rearward on the platen 43 along the slant surface in a direction indicated by an arrow Y1. The rearward waste liquid chute 451 may receive the ink flown in the direction Y1. The ink flowing in the rearward waste liquid chute 451 may flow in a direction indicated by an arrow Y2 to the sideward waste liquid chute 452. The ink reaching the sideward waste liquid chute 452 may flow in a direction indicated by an arrow Y3 to the liquid outlet 44.

As shown in FIG. 3, the intermediate tank 70 is located at a position leftward with respect to the platen 43 and lower than the platen 43. The intermediate tank 70 is located below the liquid outlet 44. As indicated by an arrow Y9 in FIG. 3, the ink flowing in the sideward waste liquid chute 452 may be drained from the platen 43 through the liquid outlet 44 and flow into the intermediate tank 70. As shown in FIG. 4, the liquid outlet 44 is located at a position to overlap an opening 72 of the intermediate tank 70, which will be described further below, in a view along the vertical direction. Therefore, the ink dripping down from the liquid outlet 44 may fall through the opening 72 of the intermediate tank 70 and may be stored in the intermediate tank 70.

Optionally, the sideward waste liquid chute 452 may not necessarily have the liquid outlet 44 but, for example, may have a form to drain the ink directly into the opening 72 of the intermediate tank 70. For another example, the platen 43 may have an outlet and a wall extending upward from the rear end thereof to guide the ink to the outlet. Moreover, the platen 43 may be connected with a waste liquid tube 55, in which the ink may flow to the intermediate tank 70.

As shown in FIGS. 3 and 4, the inkjet printer 1 has the maintenance unit 61. The maintenance unit 61 may restore a discharging condition of the nozzles 42 in the recording head 41 to an earlier condition. As shown in FIG. 4, the maintenance unit 61 is located on an outer side of the platen 43 in the widthwise direction. The maintenance unit 61 is located on a same side of the platen 43 as a standby position of the recording head 41. The standby position of the recording head 41 is a position, at which the carriage 40 stands by when the inkjet printer 1 does not print an image on the sheet P. For example, the maintenance unit 61 may be located rightward with respect to the platen 43. The maintenance unit 61 is located at a position lower than the recording head 41 within a scanning range of the recording head 41. The maintenance unit 61 has a cap (not shown) and a suction pump (not shown).

The cap is located at a position to face the recording head 41 located at the standby position. The cap may collect the ink being waste liquid from the nozzles 42. The cap may be driven to move up and down by power of a driving motor (not shown). The cap may move upward to a position where the cap covers the nozzle surface 421 of the recording head 41 located at the standby position. The cap covering the nozzle surface 421 may seal the nozzle surface 421.

The suction pump is connected to the cap. The suction pump may be driven by the driving motor to suction the ink being the waste liquid from the nozzles 42 sealed by the cap. In other words, the suction pump may collect the ink from the nozzles 42. The driving motor may be controlled by the controller 100. The suction pump may be, for example, a tube pump. The suction pump is connected with a waste liquid tube 55. The ink suctioned from the nozzles 42 by the suction pump may be drained into the intermediate tank 70 through the waste liquid tube 55. In other words, the ink drained from the maintenance unit 61 may flow into the intermediate tank 70 through the waste liquid tube 55, as indicated by an arrow Y4 in FIGS. 3 and 4.

The wiper 62 may wipe the nozzle surface 421 of the recording head 41 to remove the ink from the nozzles 42. In other words, the wiper 62 may collect the ink adhered to the nozzles 42 by wiping the nozzle surface 421. The wiper 62 may be made of rubber. The wiper 62 is located at a position in the scanning range of the recording head 41. The wiper 62 is located to be lower than the recording head 41. The wiper 62 is located between the platen 43 and the maintenance unit 61 in the widthwise direction.

An upper end of the wiper 62 may contact the nozzle surface 421 of the recording head 41. The wiper 62 is supported by a holder (not shown) and may move in the vertical direction. When the inkjet printer 1 records an image, the wiper 62 moves downward to a position where the wiper 62 may not contact the nozzle surface 421. After the maintenance unit 61 suctions the ink from the nozzles 42, the wiper 62 may move upward to a position where the wiper 62 contacts the nozzle surface 421. The wiper 62 moved to the upper position may contact the nozzle surface 421 of the recording head 41 that runs on the wiper 62. Thereby, the wiper 62 may wipe the nozzle surface 421 and remove the ink being the waste liquid adhered to the nozzles 42. The ink removed from the nozzles 42 by the wiper 62 may flow on the wiper 62 into the liquid reservoir 63.

The cleaning liquid injector unit 64 is located in the vicinity of the wiper 62. The cleaning liquid injector unit 64 is located on the same side of the platen 43 as the wiper 62 in the scanning direction of the recording head 41. The cleaning liquid injector unit 64 includes a cleaning liquid injector nozzle 641, a cleaning liquid supplying tube 642, and a cleaning liquid reservoir 643.

The cleaning liquid injector nozzle 641 may inject cleaning liquid for cleaning at the wiper 62. The cleaning liquid injector nozzle 641 is located at a position where the cleaning liquid from the cleaning liquid injector nozzle 641 may reach the wiper 62. The cleaning liquid is stored in the cleaning liquid reservoir 643. When the controller 100 operates a cleaning liquid supplying unit, (not shown) which includes a pump, the cleaning liquid supplying unit may supply the cleaning liquid stored in the cleaning liquid reservoir 643 to the cleaning liquid injector nozzle 641 through the cleaning liquid supplying tube 642. The cleaning liquid injector nozzle 641 may inject the cleaning liquid supplied from the cleaning liquid reservoir 643 at the wiper 62. The cleaning liquid injected from the cleaning liquid injector nozzle 641 may be stored in the liquid reservoir 63 as waste liquid.

As shown in FIG. 3, the liquid reservoir 63 is located below the wiper 62. The liquid reservoir 63 may store the ink removed by the wiper 62 from the nozzle surface 421 and the cleaning liquid injected from the cleaning liquid injector nozzle 641. In other words, the liquid reservoir 63 may collect the cleaning liquid injected from the cleaning liquid injector nozzle 641.

The liquid reservoir 63 is a casing having an opening 631 on an upper side thereof. The ink removed by the wiper 62 and the cleaning liquid injected from the cleaning liquid injector nozzle 641 may fall through the opening 631 of the liquid reservoir 63 and stay in the liquid reservoir 63. In other words, the liquid reservoir 63 has the opening 631, through which the ink removed by the wiper 62 and the cleaning liquid injected from the cleaning liquid injector nozzle 641 may be stored inside the liquid reservoir 63. The liquid reservoir 63 is connected with the intermediate tank 70 through a waste liquid tube 55. The ink and the cleaning liquid collected in the liquid reservoir 63 may flow into the waste liquid tube 55, as indicated by an arrow Y5 shown in FIGS. 3 and 4. Further, the ink and the cleaning liquid may be transported through the waste liquid tube 55 to the intermediate tank 70. The intermediate tank 70 has a port 712, through which the intermediate tank 70 may receive the ink and the cleaning liquid drained from the liquid reservoir 63. The port 712 is a part of the intermediate tank 70, to which the waste liquid tube 55 extended from the liquid reservoir 63 is connected.

The duct 66 may suction mist of liquid produced in the main housing 11. In particular, the duct 66 may suction mist of the ink discharged from the nozzles 42 of the recording head 41 and/or mist of the cleaning liquid injected from the cleaning liquid injector nozzle 641. In other words, the duct 66 may suction the ink discharged from the nozzles 42 of the recording head 41 and the cleaning liquid injected from the cleaning liquid injector nozzle 641 in the form of mist. The duct 66 is located on a leftward side in the main housing 11. The duct 66 includes a fan 69 and a conduit 67.

The fan 69 may expel the air inside the main housing 11 to the outside of the main housing 11 through an air outlet 691. The fan 69 may be driven by the controller 100. The fan 69 is connected with the conduit 67 being a passage for the air. The conduit 67 is a passage, through which the air suctioned from the inside of the main housing 11 may be transported to the air outlet 691. One end of the conduit 67 is connected to the fan 69 and to the air outlet 691, and the other end of the conduit 67 is connected to an air inlet 68, through which the air inside the main housing 11 may be drawn into the conduit 67. The conduit 67 has a convex section, which curves downward. For example, the conduit 67 may have a form of U.

When the fan 69 is driven, the air pressure inside the main housing 11 may be lowered, and the air in the main housing 11 may be suctioned through the air inlet 68. The liquid in the form of mist discharged from the nozzles 42 of the recording head 41 may be suctioned together with the air inside the main housing 11 through the air inlet 68, as indicated by an arrow Y7 shown in FIG. 3. The liquid in the form of mist may flow through the conduit 67 and may be condensed in the convex section of the conduit 67 into liquid and accumulate in the convex section as waste liquid. To the convex section of the conduit 67, a waste liquid tube 55 is connected. The waste liquid accumulated in the convex section of the conduit 67 may exit the conduit 67 through the waste liquid tube 55 to flow to the intermediate tank 70. The intermediate tank 70 has a port 713, through which the waste liquid drained from the duct 66 may be received. The port 713 is a part of the intermediate tank 70, to which the waste liquid tube 55 extended from the conduit 67 is connected.

The controller 100 may execute a flushing process, in which the controller 100 operates the recording head 41 to discharge the ink from the nozzles 42 at the opening 72 of the intermediate tank 70. For executing the flushing process, the controller 100 may move the recording head 41 to a flushing area, where the flushing process is performed.

In FIGS. 3 and 4, the recording head 41 located in the flushing area is illustrated. The flushing process is performed in the flushing area, which is on an opposite side to the standby position of the recording head 41 across the platen 43. In the present embodiment, the flushing process is executed on a leftward side to the platen 43 in the widthwise direction. The flushing area is an area above the opening 72 of the intermediate tank 70. As indicated by an arrow Y10 shown in FIG. 3, the ink discharged from the nozzles 42 during the flushing process, i.e., waste liquid, may fall through the opening 72 into the intermediate tank 70. In other words, the opening 72 may accept the ink being waste liquid discharged from the recording head 41 in the flushing process.

As shown in FIG. 3, at a position, in a direction of height of the inkjet printer 1, i.e., in the vertical direction, above the intermediate tank 70, a waste liquid guide 90 is arranged. The waste liquid guide 90 is a piece that may guide the ink discharged from the nozzles 42 in the flushing process to an opening 721 of the intermediate tank 7. The waste liquid guide 90 is, in the direction of height of the inkjet printer 1, located to be lower than the recording head 41. The waste liquid guide 90 is located between the nozzles 42 of the recording head 41 located in the flushing area and the opening 72 of the intermediate tank 70. The waste liquid guide 90 is retained by a retainer, which is not shown. A number of piece(s) of the waste liquid guide 90 may not necessarily be limited as long as at least one piece of waste liquid guide 90 is provided.

Figure 5:
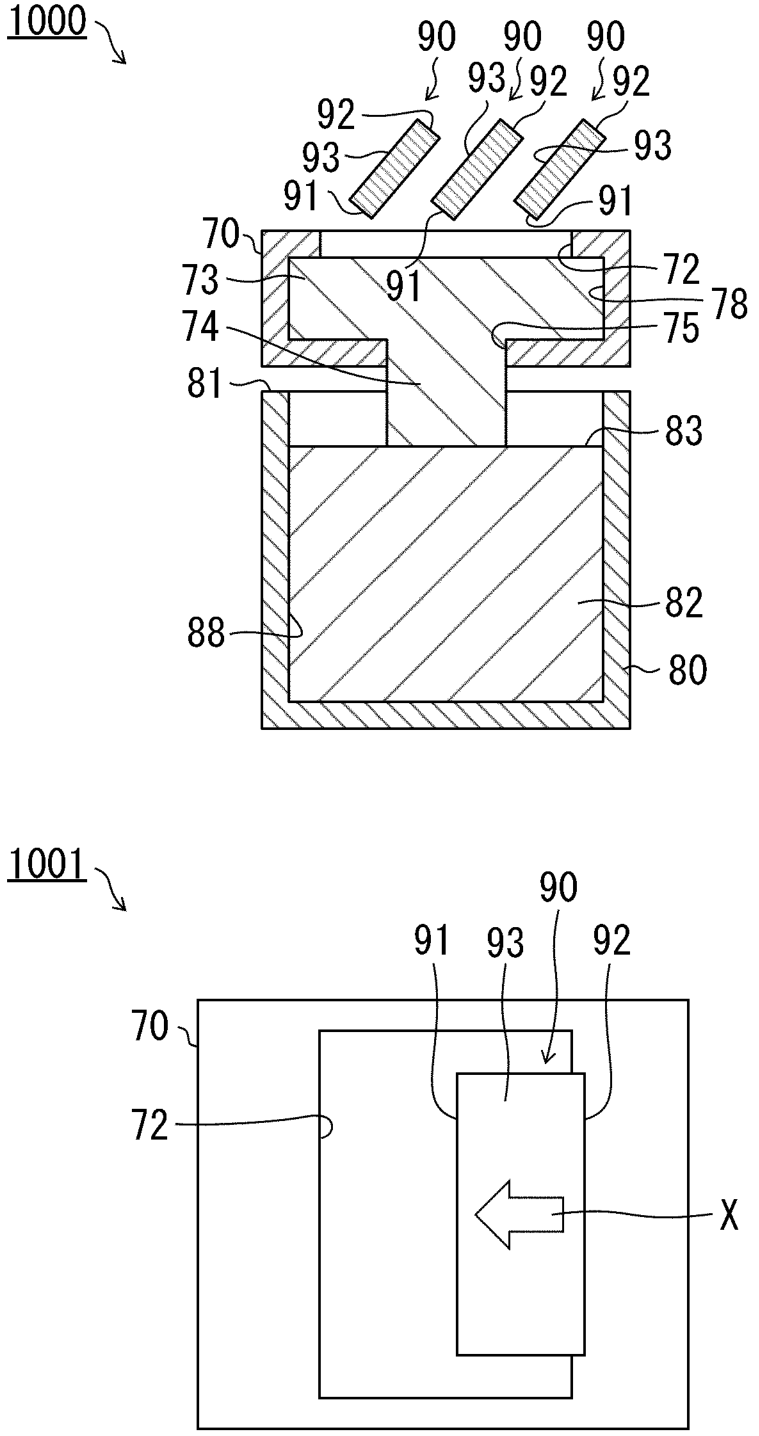
FIG. 5 is illustrative views of an intermediate tank, a waste liquid tank, and a waste liquid guide.

The waste liquid guide 90 and the intermediate tank 70 will be described below with reference to FIG. 5. FIG. 5 illustrates the intermediate tank 70, the waste liquid tank 80, and the waste liquid guide 90 which are in the same arrangement as shown in FIG. 3. A reference sign 1000 in FIG. 5 denotes a cross-sectional view of the intermediate tank 70, the waste liquid tank 80, and the waste liquid guide 90. A reference sign 1001 in FIG. 5 denotes a top plan view of the intermediate tank and the waste liquid guide 90. In the cross-sectional view 1000, illustration of the ports 711, 712, 713 in the intermediate tank 70 is omitted for a viewer's easier understanding.

As shown in the cross-sectional view 1000, the waste liquid guide 90 is located to be higher than the opening 72 of the intermediate tank 70. An end 92 of the waste liquid guide 90 toward the recording head 41 and an end 91 of the waste liquid guide 90 toward the intermediate tank 70 are located to be higher than the opening 72. Optionally, the waste liquid guide 90 may be arranged to partly overlap the opening 72 in the vertical direction. In other words, the waste liquid guide 90 may be located at a position where the end 91 of the waste liquid guide 90 toward the intermediate tank 70 is located at the same height or to be lower than the opening 72. A surface of the waste liquid guide 90 on a side toward the nozzles 42 is a slant surface 93, which slants with respect to the opening 72.

The top plan view 1001 in FIG. 5 illustrates a positional relation between the waste liquid guide 90 and the opening 72 of the intermediate tank 70. In the top plan view 1001 in FIG. 5, for a viewer's easier understanding, a single piece of waste liquid guide 90 alone is illustrated while the other pieces of waste liquid guide 90 are omitted. In the top plan view to look down the main housing 11 from an upper side, the end 91 of the waste liquid guide 90 toward the intermediate tank 70 is located to overlap the opening 72.

The ink discharged in the flushing process may land on the slant surface 93 of the waste liquid guide 90. As indicted by an arrow X in the top plan view 1001 in FIG. 5, the ink landing on the slant surface 93 may flow down on the slant surface 93 and drip down from the end 91 of the waste liquid guide 90 to the intermediate tank 70 through the opening 72.

<Configuration of Intermediate Tank>

The configuration of the intermediate tank 70 will be described below with reference to FIGS. 3-5. The intermediate tank 70 is a container to store the ink drained from a plurality of waste liquid collecting devices. As shown in FIG. 3, the intermediate tank 70 is located at a position on a leftward side in the inkjet printer 1 and above the waste liquid tank 80. The intermediate tank 70 is located at a position, in flowing directions of the ink being the waste liquid, between the platen 43 and the waste liquid tank 80, between the maintenance unit 61 and the waste liquid tank 80, and between the liquid reservoir 63 and the waste liquid tank 80. Moreover, the intermediate tank 70 is located between the liquid reservoir 63 and the waste liquid tank 80 in a flowing direction of the cleaning liquid being the waste liquid. In other words, the intermediate tank 70 relays the ink to flow from the waste liquid collecting devices to the waste liquid tank 80. The intermediate tank 70 includes the ports 711, 712, 713, the opening 72, a first waste liquid absorber 73, and a first waste liquid reservoir 78.

As shown in FIGS. 3 and 4, the ports 711, 712, 713 are parts of the intermediate tank 70, to which the waste liquid tubes 55 are connected. The port 711 is a part of the intermediate tank 70, through which the ink drained from the maintenance unit 61 may be received. The ink drained from the maintenance unit 61 may be stored in the intermediate tank 70 through the waste liquid tube 55. The port 712 is a part of the intermediate tank 70, through the ink and the cleaning liquid drained from the liquid reservoir 63 may be received. The ink and the cleaning liquid drained from the liquid reservoir 63 may be stored in the intermediate tank 70 through the waste liquid tube 55. The port 713 is a part of the intermediate tank 70, through which the waste liquid drained from the duct 66 may be received. The waste liquid drained from the duct 66 may be stored in the intermediate tank 70 through the waste liquid tube 55.

The opening 72 is formed on the upper face of the intermediate tank 70. The opening 72 of the intermediate tank 70 is formed at a position coincident with the liquid outlet 44 in the platen 43 in the vertical direction. The opening 72 of the intermediate tank 70 may accept the ink dripping down from the liquid outlet 44 in the platen 43. A size of the opening 72 of the intermediate tank 70 is larger than a size of the liquid outlet 44 in the platen 43. Thus, the opening 72 may accept the ink flowing down from the platen 43. The opening 72 of the intermediate tank 70 is formed at a position to coincide with the nozzles 42 of the recording head 41 in the vertical direction. Thus, the opening 72 may accept the ink discharged from the nozzles 42. The size of the opening 72 is larger than a size of the nozzle surface 421.

The liquid received through the ports 711, 712, 713 and the opening 72 may be stored in the first waste liquid reservoir 78. In other words, the first waste liquid reservoir 78 may store the ink and the cleaning liquid drained from the platen 43, the maintenance unit 61, the liquid reservoir 63, and the duct 66. Moreover, the first waste liquid reservoir 78 may store the ink discharged in the flushing process.

As shown in FIG. 5, the intermediate tank 70 has the first waste liquid absorber 73 inside. The first waste liquid absorber 73 is located inside the first waste liquid reservoir 78. The first waste liquid absorber 73 may absorb the liquid received in the first waste liquid reservoir 78 through the ports 711, 712, 713, and the opening 72. The first waste liquid absorber 73 may be made of, for example, unwoven fabric, sponge, or cotton that may absorb the liquid. The first waste liquid absorber 73 has a protrusion 74 protruding toward the waste liquid tank 80. In particular, the protrusion 74 protrudes outward from the intermediate tank 70 through an opening 75 formed in the intermediate tank 70. In other words, the protrusion 74 is exposed outside the intermediate tank 70 through the opening 75. Through the protrusion 74, the liquid collected in the first waste liquid reservoir 78 through the ports 711, 712, 713 and the opening 72 may be drained outside the intermediate tank 70.

<Configuration of Waste Liquid Tank>

The configuration of the waste liquid tank 80 will be described below with reference to FIGS. 3-5. The waste liquid tank 80 is mountable in and demountable from the main housing 11. The liquid drained from the intermediate tank 70 may flow into the waste liquid tank 80 as indicated by an arrow Y6 in FIG. 3.

As shown in the cross-sectional view 1000 in FIG. 5, the waste liquid tank 80 has an opening 81, a second waste liquid absorber 82, and a second waste liquid reservoir 88. The cross-sectional view 1000 in FIG. 5 illustrates the waste liquid tank 80 mounted in the main housing 11. The opening 81 is formed at a position to coincide with the protrusion 74 of the intermediate tank 70 in the vertical direction. In the waste liquid tank 80 shown in FIG. 5, the opening 81 is formed on an upper face of the waste liquid tank 80. The opening 81 has a size, through which the protrusion 74 of the intermediate tank 70 may be inserted.

The liquid in the intermediate tank 70 may be passed to the second waste liquid reservoir 88 in the waste liquid tank 80 through the protrusion 74. In other words, the ink and the cleaning liquid drained from the platen 43, the maintenance unit 61, the liquid reservoir 63, and the duct 66 may be stored in the second waste liquid reservoir 88 through the intermediate tank 70. The second waste liquid reservoir 88 is a part of the waste liquid tank 80 in which the liquid from the waste liquid collecting devices is stored.

The waste liquid tank 80 has the second waste liquid absorber 82 inside. The second waste liquid absorber 82 is located inside the second waste liquid reservoir 88. The second waste liquid absorber 82 may absorb the liquid passed from the protrusion 74 of the intermediate tank 70. The second waste liquid absorber 82 may be made of, for example, unwoven fabric, sponge, or cotton that may absorb the liquid.

As shown in the cross-sectional view 1000 in FIG. 5, in the condition where the waste liquid tank 80 is mounted in the main housing 11, the second waste liquid absorber 82 is in contact with the protrusion 74 of the intermediate tank 70. The protrusion 74 of the intermediate tank 70 extends through the opening 81 to contact the second waste liquid absorber 82. The second waste liquid absorber 82 has a contact surface 83, on which the protrusion 74 abuts. In particular, an upper surface of the second waste liquid absorber 82 is the contact surface 83, on which a tip end of the protrusion 74 abuts. With the second waste liquid absorber 82 having the contact surface 83, the liquid absorbed in the first waste liquid absorber 73 in the intermediate tank 70 may be passed from the protrusion 74 to the second waste liquid absorber 82. Therefore, the liquid drained from the protrusion 74 may be stored in the second waste liquid reservoir 88.

<Benefits>

According to the embodiment described above, the liquid drained from the platen 43, the maintenance unit 61, the liquid reservoir 63, and the duct 66 may be collected in the intermediate tank 70. Therefore, the waste liquid tank 80 may not need to have the ports 711, 712, 713 for receiving the liquid drained from the platen 43, the maintenance unit 61, the liquid reservoir 63, and the duct 66. Accordingly, the form of the waste liquid tank 80 may be simplified.

According to the embodiment described above, the intermediate tank 70 has the form to drain the liquid, in other words, a drainer, i.e., the protrusion 74, which contacts the waste liquid tank 80. Therefore, the liquid drained from the drainer may flow down on a part of the waste liquid tank 80 and may be received to be stored in the second waste liquid reservoir 88. Accordingly, the liquid may be prevented from leaking outside the intermediate tank 70 or the waste liquid tank 80.

According to the embodiment described above, the first waste liquid absorber 73 in the intermediate tank 70 has the form to drain the liquid, i.e., the protrusion 74. Therefore, the first waste liquid reservoir 78 may keep the liquid in the protrusion 74. Accordingly, when the intermediate tank 70 moves or vibrates, the liquid may be restrained from scattering around in droplets. Further, according to the embodiment described above, the waste liquid tank 80 has the second waste liquid absorber 82, on which the first waste liquid absorber 73 of the intermediate tank 70 abuts. Therefore, the second waste liquid reservoir 88 may keep the liquid therein. Accordingly, when the waste liquid tank 80 moves or vibrates, the liquid may be restrained from scattering around in droplets.

According to the embodiment described above, the liquid in the first waste liquid reservoir 78 may be passed from the protrusion 74 to the second waste liquid absorber 82 through the contact between the protrusion 74 and the second waste liquid absorber 82. Therefore, the liquid may be restrained from leaking outside the intermediate tank 70 or the waste liquid tank 80.

According to the embodiment described above, the waste ink caused in relation with the recording head 41 may be stored in the intermediate tank 70. Moreover, the liquid discharged on the platen 43 may be collected in the intermediate tank 70. Furthermore, the liquid collected by the cap and the suction pump may be stored in the intermediate tank 70. According to the embodiment described above, the liquid produced by being suctioned by the duct 66 may be stored in the intermediate tank 70. Moreover, the ink removed from the recording head 41 by the wiper 62 may be stored in the intermediate tank 70. Furthermore, the ink discharged from the nozzles 42 in the flushing process may be stored in the intermediate tank 70.

According to the embodiment described above, the ink discharged in the flushing process may be guided by the waste liquid guide 90 to the opening 721 formed in the intermediate tank 70. Therefore, the ink discharged from the nozzles 42 may be restrained from leaking outside the intermediate tank 70. According to the embodiment descried above, the cleaning liquid drained from the liquid reservoir 63 may flow into the intermediate tank 70. Thus, the cleaning liquid injected from the cleaning liquid injector nozzle 641 may be stored in the intermediate tank 70.

First Modified Example

Figure 6:
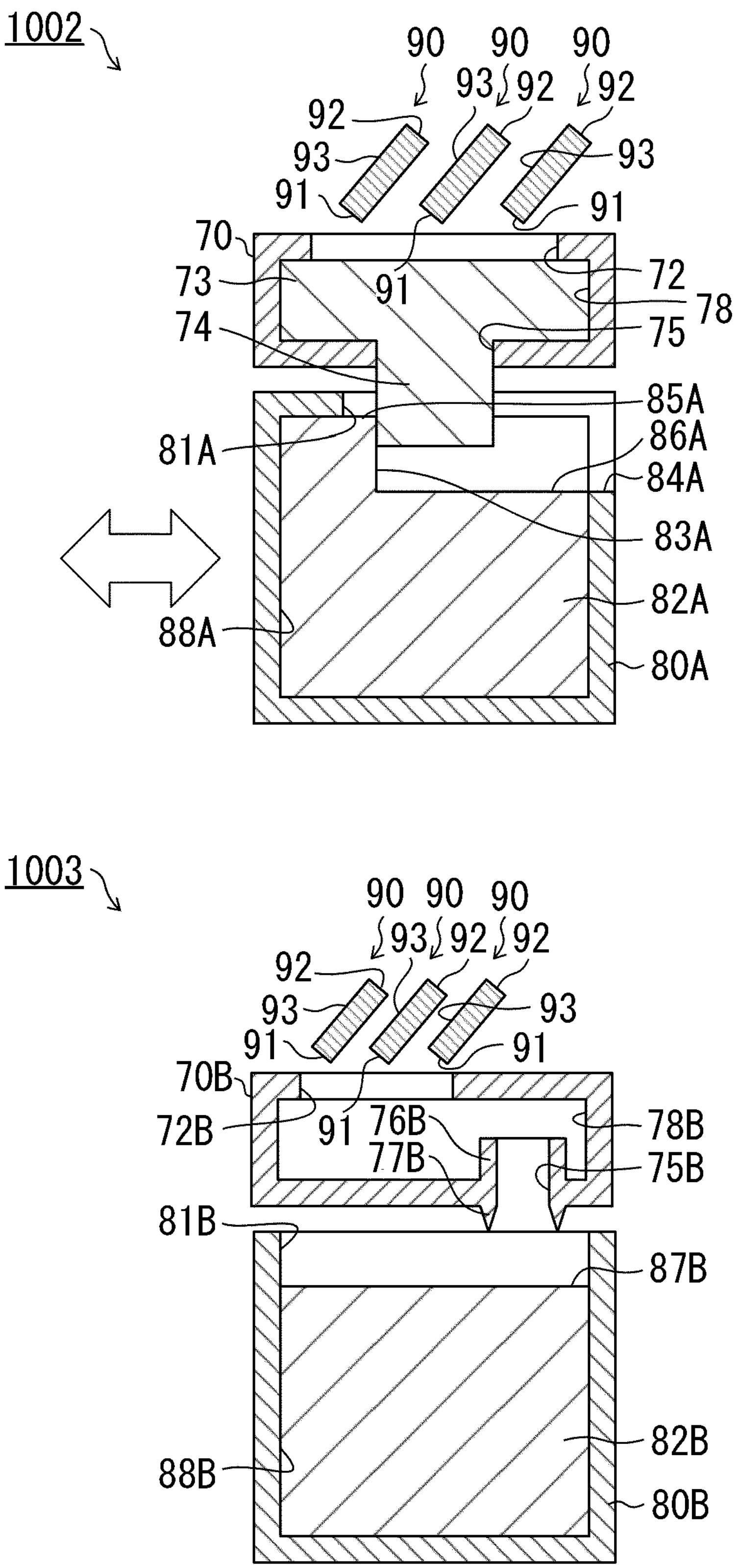
FIG. 6 is illustrative views of an intermediate tank and a waste liquid tank.

A first modified example of the inkjet printer 1 according to the first embodiment of the present disclosure will be described below with reference to FIG. 6. FIG. 6 shows the first modified example of the intermediate tank 70 and a waste liquid tank 80A. A reference sign 1002 in FIG. 6 denotes a cross-sectional view of the intermediate tank 70 and the waste liquid tank 80A according to the first modified example. In the following paragraphs, items that are substantially identical to those described above will be referred to by the same reference signs, and description of those items is herein omitted. The cross-sectional view 1002 illustrates the waste liquid tank 80A mounted in the main housing 11. A bi-directional arrow in the cross-sectional view 1002 in FIG. 6 indicates the mounting/demounting direction of the waste liquid tank 80A. In the cross-sectional view 1002, illustration of the ports 711, 712, 713 in the intermediate tank 70 is omitted for a viewer's easier understanding.

According to the first modified example, the waste liquid tank 80A has a cutout 84A. The cutout 84A is formed in a part of the waste liquid tank 80A, in an area inward in the main housing 11 in the mounting/demounting direction of the waste liquid tank 80A. In particular, the cutout 84A may be a dent formed in a part of the waste liquid tank 80A on an inner side in the mounting/demounting direction to mount the waste liquid tank A in the main housing 11. The cutout 84 has a substantial width to allow the protrusion 74 of the intermediate tank 70 to move there-through. In other words, the cutout 84A allows the protrusion 74 of the intermediate tank 70 to pass there-through in the waste liquid tank 80A when the waste liquid tank 80A is mounted in or demounted from the main housing 11.

The waste liquid tank 80A has a second waste liquid absorber 82A inside. On an upper side of the second waste liquid absorber 82A, a first surface 85A, a second surface 86A, and a step surface 83A are formed. In other words, the second waste liquid absorber 82A has surfaces in different levels. In the arrangement where the waste liquid tank 80A is mounted in the main housing 11, the first surface 85A is located to be higher than the tip end of the protrusion 74 of the intermediate tank 70. In the arrangement where the waste liquid tank 80A is mounted in the main housing 11, meanwhile, the second surface 86A is located to be lower than the tip end of the protrusion 74 of the intermediate tank 70. In other words, the second surface 86A may not contact or collide with the protrusion 74 when the waste liquid tank 80A moves in the mounting/demounting direction.

The step surface 83A connects the first surface 85A and the second surface 86A. The step surface 83A extends in a direction intersecting orthogonally with the first surface 85A and with the second surface 86A. The step surface 83A is a surface, on which the protrusion 74 of the intermediate tank 70 abuts in the arrangement where the waste liquid tank 80A is mounted in the main housing 11. The liquid in the first waste liquid reservoir 78 in the intermediate tank 70 may flow down from the protrusion 74 to the step surface 83A and may be absorbed in the second waste liquid absorber 82A. Thus, the liquid drained from the protrusion 74 may be stored in the second waste liquid reservoir 88A.

With the second waste liquid absorber 82A having the different-leveled surfaces, the protrusion 74 of the intermediate tank 70 may move in the waste liquid tank 80A through the lowered area above the second surface 86A being the lower surface. In other words, while the waste liquid tank 80A moves in the mounting/demounting direction, the protrusion 74 of the intermediate tank 70 may not collide with the second waste liquid absorber 82A in the waste liquid tank 80A. Optionally, for example, the step surface 83A may be a slant surface connecting the first surface 85A and the second surface 86A. For another example, the second waste liquid absorber 82A may not necessarily have the step surface 83A.

According to the first modified example, the protrusion 74 of the intermediate tank 70 may pass through the area in the cutout 84A in the waste liquid tank 80A when the waste liquid tank 80A moves in the direction to be mounted in or demounted from the main housing 11. Therefore, when the waste liquid tank 80A is mounted in or demounted from the main housing 11, the protrusion 74 of the intermediate tank 70 may not contact the waste liquid tank 80A. Accordingly, the liquid may be restrained from staining on the outer side of the waste liquid tank 80A.

Second Modified Example

A second modified example of the inkjet printer 1 according to the first embodiment of the present disclosure will be described below with reference to FIG. 6. A reference sign 1003 in FIG. 6 denotes a cross-sectional view of an intermediate tank 70B and a waste liquid tank 80B. In the following paragraphs, items that are substantially identical to those described above will be referred to by the same reference signs, and description of those items is herein omitted. The cross-sectional view 1003 illustrates the waste liquid tank 80B mounted in the main housing 11. In the cross-sectional view 1003, illustration of the ports 711, 712, 713 in the intermediate tank 70B is omitted for a viewer's easier understanding.

According to the second modified example, the intermediate tank 70A does not have the first waste liquid absorber 73. Inside the intermediate tank 70B, a liquid reservoir wall 76B for storing the ink collected from the waste liquid collecting devices is formed. The liquid reservoir wall 76B may block the ink received through the ports 711, 712, 713, which are not shown, from flowing to the outlet 75B. An opening 72B is an opening, through which the ink collected from the platen 43 and the ink discharged in the flushing process may be received in the intermediate tank 70B.

An outlet 75B is formed at a position not to overlap the opening 72B that accepts the waste liquid from the waste liquid collecting devices. In other words, the outlet 75B is formed at a position where the waste liquid accepted through the opening 72B may not directly fall there-through.

The liquid reservoir wall 76B is formed along an edge of the outlet 75B. The liquid reservoir wall 76B extends inward in the intermediate tank 70B. With the liquid reservoir wall 76B, a predetermined amount of the ink collected by the waste liquid collecting devices may be stored in the first waste liquid reservoir 78B in the intermediate tank 70B. When the amount of the ink in the first waste liquid reservoir 78B exceeds the predetermined amount, the exceeded amount of the ink in the first waste liquid reservoir 78B may flow over the liquid reservoir wall 76B into the outlet 75B. The ink flowing down through the outlet 75B may be drained outside the intermediate tank 70B.

In the intermediate tank 70B, a waste liquid guide 77B is formed continuously with the outlet 75B on an outer side of the intermediate tank 70B. The waste liquid guide 77B may guide the ink flowing down from the outlet 75B to the waste liquid tank 80B. The waste liquid guide 77B has a form to be thinner toward the lower side such that an end of the waste liquid guide 77B toward the waste liquid tank 80B points downward. In a top plan view, the end of the waste liquid guide 77B toward the waste liquid tank 80B is located at a position to overlap the opening 81B of the waste liquid tank 80B. Along the waste liquid guide 77B, the ink flowing down through the outlet 75B may be drained at the opening 81B of the waste liquid tank 80B. Accordingly, the ink may be restrained from leaking outside the waste liquid tank 80B.

With the outlet 75B, the liquid reservoir wall 76B, and the waste liquid guide 77B, the ink received in the intermediate tank 70B through the ports 711, 712, 713, and the opening 72B may be drained from the intermediate tank 70B.

The liquid drained from the intermediate tank 70B into the waste liquid tank 80B through the opening 81B may be absorbed in the second waste liquid absorber 82B in the waste liquid tank 80B. Thus, the liquid may be stored in the second waste liquid reservoir 88B in the waste liquid tank 80B. The second waste liquid absorber 82B has a receiver surface 87B, on which the liquid drained from the intermediate tank 70B through the outlet 75B may be received. According to the second modified example, the intermediate tank 70B may not necessarily have the first waste liquid absorber.

SECOND EMBODIMENT

Figure 7:
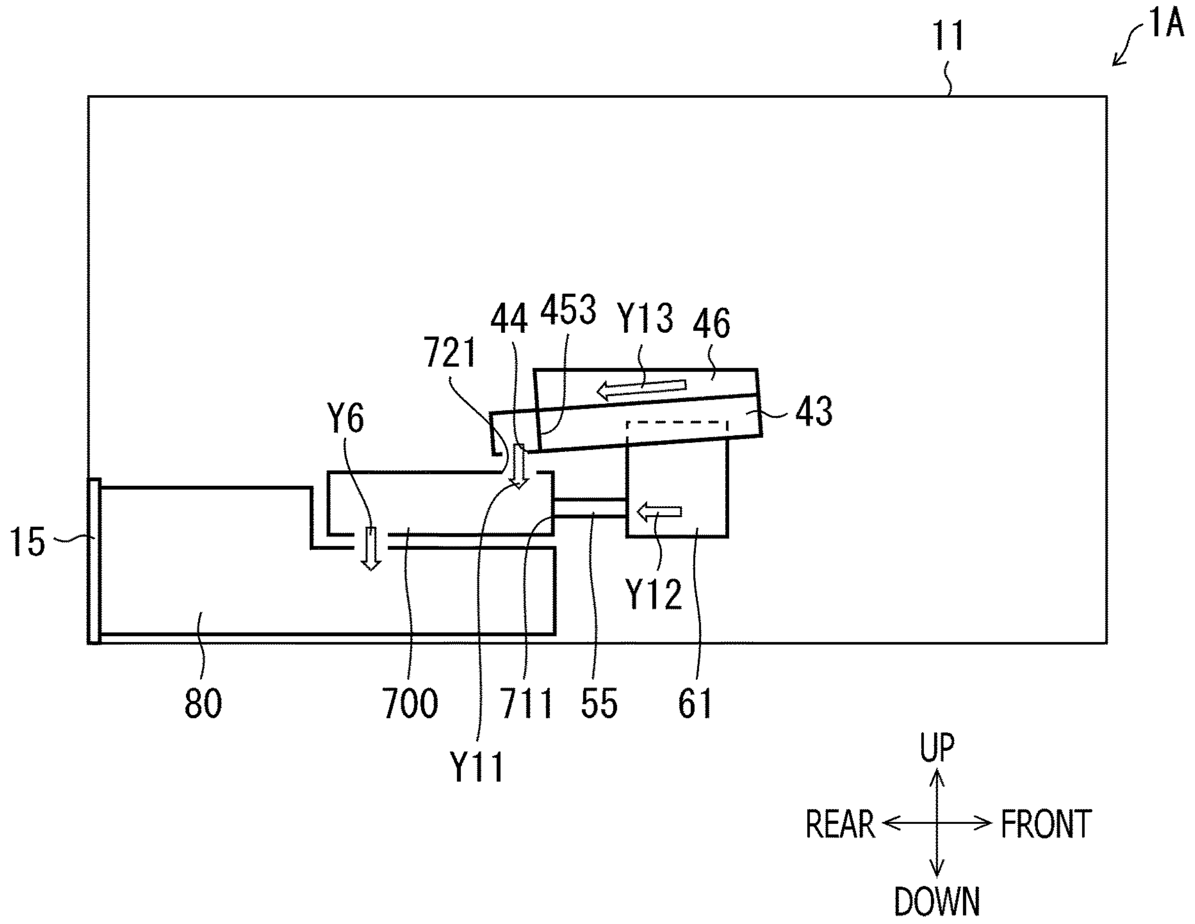
FIG. 7 is an illustrative view of an inkjet printer viewed from a leftward side.
Figure 8:
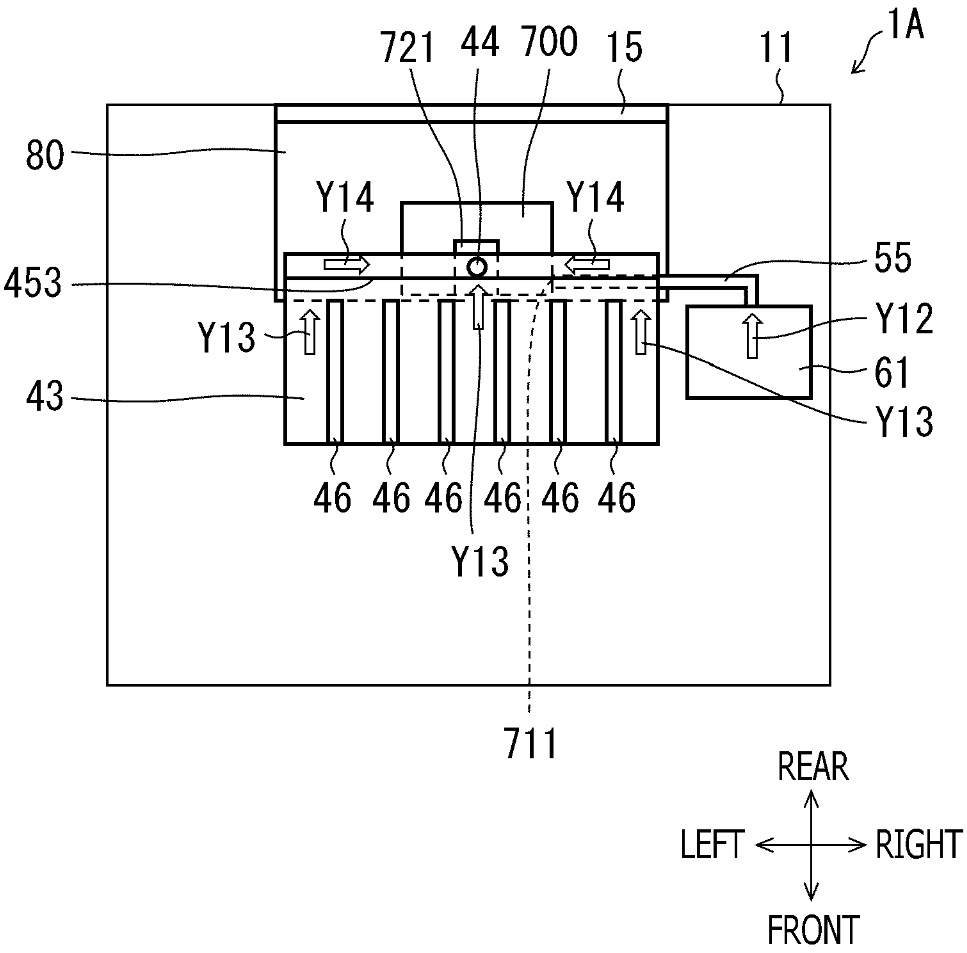
FIG. 8 is an illustrative view of the inkjet printer viewed from a front side.

An inkjet printer 1A according to a second embodiment of the present disclosure will be described below with reference to FIGS. 7-8. FIG. 7 is an illustrative view of the inkjet printer 1A viewed from a leftward side. FIG. 8 is a top plan view to illustrate an area in the inkjet printer 1A including a main part related to the second embodiment. In the following paragraphs, items that are substantially identical to those described above will be referred to by the same reference signs, and description of those items is herein omitted.

As shown in FIGS. 7 and 8, the inkjet printer 1A has the recorder 4 (see FIGS. 2-4), the platen 43, the maintenance unit 61, an intermediate tank 700, and the waste liquid tank 80.

The intermediate tank 700 and the waste liquid tank 80 are located in a rearward area in the inkjet printer 1A. The tank exchangeable unit 15 is located on the rear side of the main housing 11. The waste liquid tank 80 may be mountable in and demountable from the main housing 11 from the rear side.

The intermediate tank 700 is located rearward with respect to the platen 43. A waste liquid chute 453 and the liquid outlet 44 are located on the rear end of the platen 43. The ink being the waste liquid discharged from the nozzles 42 of the recording head 41 at the platen 43 may flow on the slant surface to the waste liquid chute 453, as indicated by an arrow Y13 in FIG. 8. The ink reaching the waste liquid chute 453 may flow to the liquid outlet 44 as indicated by an arrow Y14 in FIG. 8. The ink reaching the liquid outlet 44 may flow toward the opening 721 in the intermediate tank 700 as indicated by an arrow Y11 in FIG. 7. The opening 721 may thus accept the ink drained from the platen 43.

The maintenance unit 61 is a unit including the cap and the suction pump described earlier. The ink being the waste liquid collected by the maintenance unit 61 may be drained into the intermediate tank 700 through the waste liquid tube 55 as indicated by an arrow Y12 in FIGS. 7 and 8. The intermediate tank 700 has the port 711, through which the ink drained from the maintenance unit 61 may be received.

The inkjet printer 1A may have a feeder 3 (see FIG. 2) at, for example, an upper position in the main housing 11. In this arrangement, in a lower area and a rearward area in the inkjet printer 1A, neither the feeder tray 21 to contain the sheets P nor the guide member 33 to guide the sheets P being conveyed may be located. In other words, the inkjet printer 1A in this arrangement may have a substantial amount of space to accommodate the waste liquid tank 80 in the lower area and the rearward area. Therefore, the waste liquid tank 80 may be located in the rearward area in the main housing 11 in the inkjet printer 1A.

More Examples

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, the sheet P may not necessarily be conveyed in the conveyer path R by the rollers, e.g., the conveyer roller 50 and the ejection roller 52, but may be conveyed by devices in different forms such as, for example, belt(s) and drum(s).

For another example, the intermediate tank 70 may not necessarily have the ports 711, 712, 713, and the openings 72, 721. For example, the intermediate tank may have a single opening, and the waste liquid collected by the waste liquid collecting devices may be drained into the intermediate tank through the single opening. For another example, the waste liquid tubes connected to the respective waste liquid collecting devices may be merged into a single waste liquid tube, and the single waste liquid tube may be connected to the intermediate tank 70, 700.

What is claimed is:

1. A liquid discharging apparatus, comprising:

a housing;

a liquid discharging device configured to discharge liquid;

a first waste liquid collecting device and a second waste liquid collecting device located at different positions, the first waste liquid collecting device and the second waste liquid collecting device being configured to collect the liquid discharged from the liquid discharging device respectively;

an intermediate tank having:

a first waste liquid reservoir configured to store the liquid received from the first waste liquid collecting device and the second waste liquid collecting device; and a drainer for draining the liquid stored in the first waste liquid reservoir outward from the intermediate tank; and a waste liquid tank having a second waste liquid reservoir, the second waste liquid reservoir being configured to store the liquid drained from the drainer, the waste liquid tank being demountably mounted in the housing.

2. The liquid discharging apparatus according to claim 1, wherein the drainer is in contact with the waste liquid tank mounted in the housing.

3. The liquid discharging apparatus according to claim 2, wherein the intermediate tank has a waste liquid absorber configured to absorb the liquid received from the first waste liquid collecting device and the second waste liquid collecting device, and the drainer is formed in the waste liquid absorber.

4. The liquid discharging apparatus according to claim 3, wherein the waste liquid absorber has a protrusion as the drainer, the protrusion protruding toward the waste liquid tank.

5. The liquid discharging apparatus according to claim 4, wherein the waste liquid tank has a cutout at a position on an inner side of the housing in a direction to mount and demount the waste liquid tank in and from the housing.

6. The liquid discharging apparatus according to claim 2, wherein the waste liquid tank has a waste liquid absorber, the waste liquid absorber being configured to contact the drainer and absorb the liquid drained from the drainer.

7. The liquid discharging apparatus according to claim 1, wherein the liquid discharging device is a recording head having nozzles configured to discharge the liquid.

8. The liquid discharging apparatus according to claim 7, wherein the first waste liquid collecting device is a cap configured to seal the nozzles of the recording head by covering a nozzle surface, on which the nozzles are formed.

9. The liquid discharging apparatus according to claim 7, wherein the first waste liquid collecting device is a suction pump configured to suction the liquid from the nozzles.

10. The liquid discharging apparatus according to claim 7, wherein the first waste liquid collecting device is a wiper configured to remove the liquid from the nozzles.

11. The liquid discharging apparatus according to claim 7, further comprising a controller, wherein the intermediate tank has an opening at a position coincident with the nozzles, and the controller is configured to conduct a flushing process by controlling the recording head to discharge the liquid from the nozzles toward the opening.

12. The liquid discharging apparatus according to claim 11, further comprising a waste liquid guide located at an upper position with respect to the intermediate tank in a direction of height of the liquid discharging apparatus, the waste liquid guide being configured to guide the liquid discharged in the flushing process to the opening, wherein, in a plan view along the direction of height of the liquid discharging apparatus, an end of the waste liquid guide toward the intermediate tank is located at a position to coincide with the opening.

13. The liquid discharging apparatus according to claim 7, wherein the first waste liquid collecting device is a platen configured to support a recording medium being conveyed.

14. The liquid discharging apparatus according to claim 7, wherein the first waste liquid collecting device is a duct configured to suction mist of the liquid produced inside the housing.

15. The liquid discharging apparatus according to claim 1, wherein the liquid discharging device includes a head configured to discharge liquid and a cleaning liquid injector nozzle configured to discharge cleaning liquid for cleaning a wiper, the wiper being configured to remove the liquid from nozzles in the head, and the first waste liquid collecting device is a liquid reservoir having a casing with an opening, the casing being configured to store the cleaning liquid.

* * * * *